United States Patent [19]

Creegan

[11] 4,094,111
[45] June 13, 1978

[54] STRUCTURAL STEEL BUILDING FRAME HAVING RESILIENT CONNECTORS

[76] Inventor: Patrick J. Creegan, KM. 5 Carretera A, Masaya Apart. 4397, Managua D. N., Nicaragua

[21] Appl. No.: 715,264

[22] Filed: Aug. 18, 1976

Related U.S. Application Data

[63] Continuation-in-part of Ser. No. 558,975, Mar. 17, 1975, abandoned.

[51] Int. Cl.² .............................................. E04B 1/98
[52] U.S. Cl. ....................................... 52/167; 52/403; 52/721; 52/726; 403/187; 403/220; 403/364
[58] Field of Search ................ 52/167, 721, 726, 403, 52/573; 403/220-222, 161, 187, 364

[56] References Cited

U.S. PATENT DOCUMENTS

| 440,938 | 11/1890 | Anthoni | 52/167 |
|---|---|---|---|
| 768,005 | 8/1904 | Stone | 52/726 |
| 2,270,853 | 1/1942 | Forton | 403/220 |
| 2,277,885 | 3/1942 | Rodanet | 85/70 |
| 2,335,433 | 11/1943 | Minck | 52/584 |
| 2,588,225 | 3/1952 | Fish | 403/220 |
| 2,713,924 | 7/1955 | Tripp | 403/189 |
| 3,110,369 | 11/1963 | Ruzicka | 52/573 |
| 3,282,013 | 11/1966 | Borcey | 52/403 |
| 3,330,519 | 7/1967 | Thorn | 248/358 R |
| 3,852,931 | 12/1974 | Morse et al. | 52/573 |

FOREIGN PATENT DOCUMENTS

| 1,321,837 | 7/1973 | United Kingdom. | |
| 372,331 | 4/1973 | U.S.S.R. | 52/167 |

*Primary Examiner*—Alfred C. Perham
*Attorney, Agent, or Firm*—Townsend and Townsend

[57] ABSTRACT

An improved frame for a building formed of structural frame members of steel or other structural metal. The structural frame members are connected together by many resilient connectors, each connector including a bolt having resilient sleeve means surrounding the same. The bolt has a head at one end and a nut threadably mounted at its opposite end. The bolt and sleeve means are inserted through aligned, oversized holes in a pair of adjacent structural members and the nut is threaded on the bolt to interconnect the structural frame members yet allow one structural frame member to slide over the other member, such as during an earthquake, to permit dissipation of energy by the heat of friction. The sleeve means also absorbs some of the energy and allows the structural frame members to return to their initial relative positions after they have been displaced relative to each other. Several embodiments of the sleeve means are disclosed.

10 Claims, 10 Drawing Figures

SHADED AREA REPRESENTS
ENERGY ABSORBED

SHADED AREA REPRESENTS
ENERGY ABSORBED

| BOLT DIA. | a | b |
|---|---|---|
| 1/2" | .505" | .75" |
| 5/8" | .630" | .9375" |
| 3/4" | .755" | 1.125" |
| 7/8" | .880" | 1.3125" |
| 1" | 1.005" | 1.50" |

STRUCTURAL STEEL BUILDING FRAME HAVING RESILIENT CONNECTORS

This application is a continuation-in-part application of Ser. No. 558,975 filed Mar. 17, 1975, entitled RESILIENT CONNECTOR WITH STRUCTURAL MEMBERS OF BUILDING now abandoned.

This invention relates to improvements in the frames of large buildings made of structural steel or other structural metal and, more particularly, to an improved building frame whose metallic structural frame members are interconnected and held in face-to-face contact by resilient connectors for absorbing stresses and effecting the dissipation of energy caused by earthquakes or other geological disturbances.

BACKGROUND OF THE INVENTION

Modern aseismic design of structural steel buildings (particularly high-rise structures) provides for an analysis under dynamic loading, but the actual construction involves a statically connected structure. Much of the energy absorption (necessary in earthquake design) takes place in the yield zone of the material from which the frame members (columns and beams) of the building are formed. This yielding usually represents permanent deformation of the structural frame members and very often the permanent deformation is of such magnitude to have either destroyed the usefulness of the building or created the need for very expensive repair of the building. The reason for this is that, within the elastic limit of steel, the usual material of structural members, the area of the stress-strain hysteresis curve (FIG. 1) is very small. The curve defines deformation with respect to load as load is applied, and recovery to original shape and location as the load is removed.

The area of the hysteresis curve of FIG. 1 represents energy absorbed rather than energy stored. It is only when the steel material of structural frame members is worked in its yield zone that it absorbs energy, but it does not recover to its original shape because the yielding is permanent.

What is needed to accompany modern dynamic design of buildings of structural steel or other structural metal is modern dynamic connections for the numerous structural frame members of such a building, such connections being of the type which not only have shock-absorbing capabilities but also are capable of permitting structural frame members interconnected thereby to be in face-to-face contact with each other and to slide over each other so that energy tending to deform the structural frame members will be dissipated as heat generated by frictional effects. The material of such connections should be resilient so that the structural frame members will have a very "fat" hysteresis curve as shown in FIG. 2; thus, the building will recover not only its original size, shape and location but also will have absorbed energy in the connections and will have dissipated energy as heat of friction without subjecting the building frame as a whole to permanent damage due to extreme deformation.

SUMMARY OF THE INVENTION

The present invention meets the aforesaid need by providing an improved building frame of structural steel or other structural metal, wherein the structural frame members of the building are connected together by thousands of small resilient connectors which are analogous to nail and bolts in a timber structure. The connectors have resilience and stress-strain hysteresis characteristics of FIG. 2, and are placed in oversized holes in the structural frame members which they interconnect. Thus, the many connectors hold the adjacent structural frame members in face-to-face contact and permit energy absorption and energy dissipation without permanent deformation of the structural frame members.

Each connector includes a bolt having resilient sleeve means surrounding the same, a head at one end and a nut threaded on the opposite end. Thus, the connector, when extending through aligned, oversized holes in a pair of adjacent structural frame members, connects the frame members together so that they are in face-to-face contact with each other and are movable relative to each other through at least a small distance. When there is slight relative movement, such as during an earthquake, each sleeve means absorbs some energy associated with this movement and a relatively large part of such energy is dissipated as heat due to sliding friction of each pair of adjacent structural members in contact with each other. When considering thousands of such connectors in a structural steel building, it will be appreciated that a large amount of energy can be absorbed and dissipated without causing permanent deformation of the structural frame members of the building. Moreover, the connectors of the type described permit return of the various structural frame members to their original positions following relative movements thereof, assuming that there is no permanent deformation of them.

The primary object of this invention is, therefore, to provide an improved building of structural steel or other structural metal when the structural frame members of the building are connected together by many resilient connectors which allows sliding movements of adjacent frame members relative to each other so that the connectors can themselves absorb some of the energy tending to deform the structural frame members yet a major portion of such energy can be dissipated by generating heat due to sliding friction as the structural members slide over each other, thereby minimizing any tendency to cause permanent deformation of the structural frame members.

Another object of this invention is to provide a building of the type described whose resilient connectors are of the type which include a central bolt surrounded by resilient sleeve means engaging the adjacent pair of structural frame members and isolates the bolt therefrom so that the sleeve means itself yields when the structural frame member moves relative to and along the other structural frame member to avoid deformation of the bolt and assure continued positive interconnection of the frame member notwithstanding small displacements relative to each other.

Other objects of this invention will become apparent as the following specification progresses, reference being had to the accompanying drawings for an illustration of several embodiments of the invention.

Figure 1:
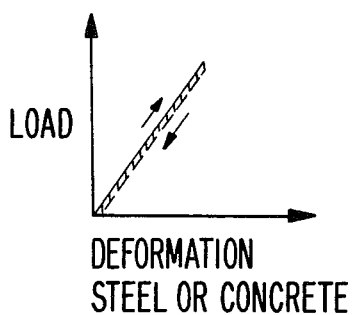
FIG. 1 is a graphical view of the relationship between applied load and structural deformation relating to structural frame members of buildings when the frame members are connected together by conventional connectors.
Figure 2:
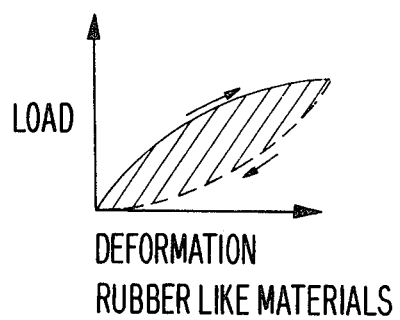
FIG. 2 is a view similar to FIG. 1 but showing the load-deformation relationship using resilient connectors in accordance with the present invention.

The present invention is directed to a building 11 of structural steel or other structural metal, the building being shown only fragmentarily in FIGS. 4, 5, 8 and 9. The building is made up of a network of columns and beams, typically of I-beam construction, so that they present flanges or gussets which overlie or abut each other in sliding engagement with each other and which can be connected together by resilient connectors 10 extending through oversized holes in such flanges or gussets.

Each connector 10 comprises a bolt 12 having a head 14 at one end thereof and being threaded at the opposite end 15 thereof so as to threadably receive a nut 16 thereon. Washers 18 and 20 can be used adjacent to head 14 and nut 16, respectively, to provide a bearing surface therefor.

Figure 3:
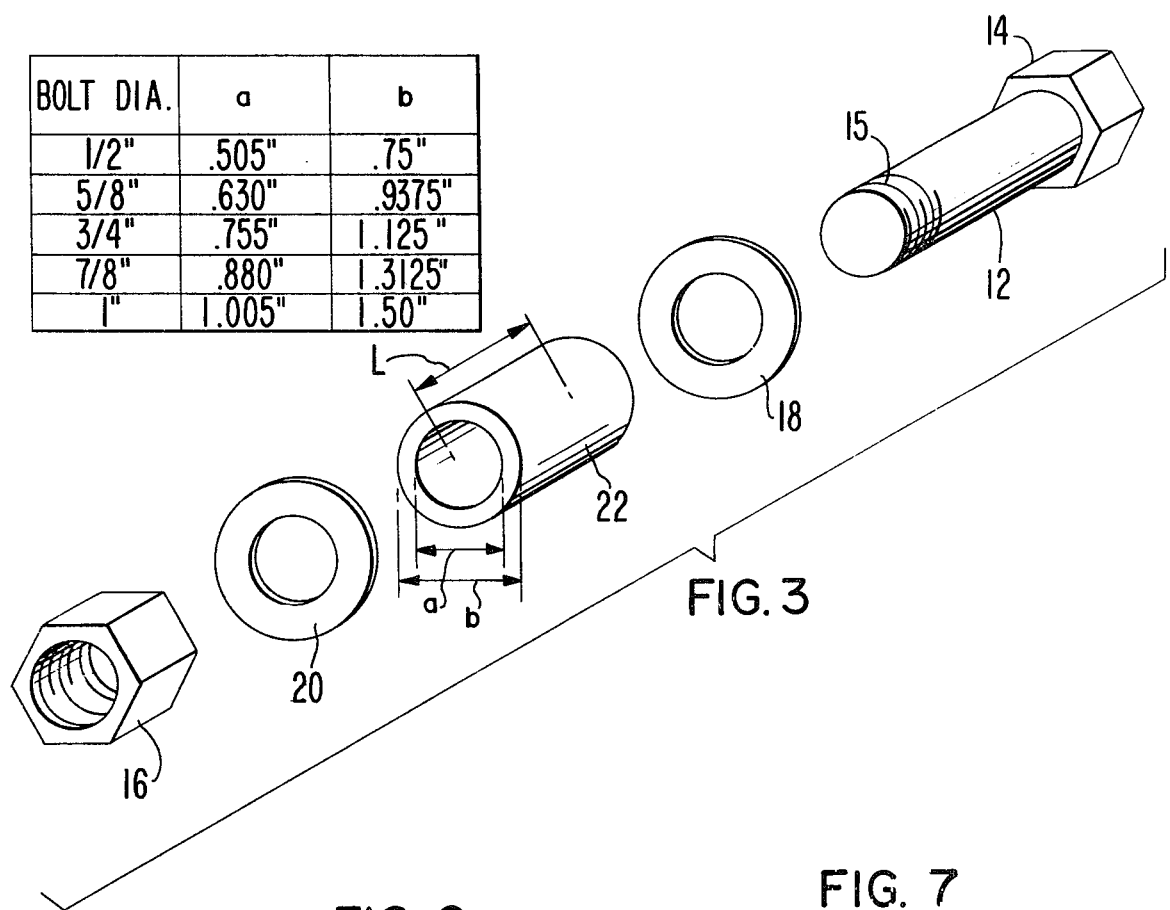
FIG. 3 is an exploded view of one embodiment of a resilient connector of the present invention.

Connector 10 further includes resilient sleeve means surrounding the major portion of bolt 12 and extending between head 14 and nut 16 or, if washers 18 and 20 are used, between the washers. One form of the sleeve means includes a single sleeve 22 substantially complementally received on bolt 12 and having a wall thickness less than the diameter of the bolt. Typical dimensions of sleeve 22 for various bolt diameters are shown in the table of FIG. 3. These are illustrative only and are not to be considered limiting in any way.

Sleeve 22 can be of any suitable resilient material, such as rubber, neoprene, nylon, Teflon and other material. The sleeve is adapted to be inserted into a pair of aligned holes in the adjacent, abutting flanges of a pair of adjacent structural frame members of building 11. The holes are oversized, i.e., are larger in cross section than the diameter of the bolt. Thus, the bolt is isolated from the frame members and one frame member can slide over the other frame member a small distance because the presence of the sleeve means without greatly or permanently deforming bolts of the various connectors 10 and without deforming the flanges of the frame members. Thus, the purpose of each connector 10 is to allow absorption by sleeve 22 of some of the energy due to thte movement of one frame member relative to the other frame member. A major portion of such energy is dissipated as heat due to the sliding movement of the flanges of adjacent frame members relative to each other. Since the flanges are in face-to-face contact with each other, frictional forces must be overcome to move one flange relative to the other. Energy required to do this is transformed into heat; thus, the oversized holes in the flanges and a connector 10 in each group of aligned holes allows for relative movements between flanges in contact with each other, the result being the dissipation of the energy which causes the movement. The frame members can return to their initial positions relative to each other without any permanent structural damage due to the construction of connector 10.

A number of connectors 10 will be used to interconnect the abutting flanges of a pair of adjacent structural frame members at the junction therebetween. For instance, in FIG. 4, a pair of beams 24 and 26 are connected to an I-beam 28 by a plurality of connectors 10. Beam 28 has an upper flange 30 to which a plate 32 is welded or otherwise secured to provide an extension of the flange. The plate projects laterally from flange 30 and is connected at each side by at least three connectors 10 to adjacent upper flanges 35 and 36 of beams 24 and 26, respectively. Similarly, the lower flanges 38 and 40 of beams 24 and 26 are connected by at least three connectors 10 to a pair of horizontal flanges 42 and 44 which are secured by welding or other suitable means to beam 28 and extend laterally from the central web 46 thereof. Beams 24 and 26 can also be connected at the central webs thereof by a pair of rigid L-shaped members 48 and 50 to vertical web 46 of beam 28 by a number of connectors 10, the heads of the bolts of such connectors being omitted for simplicity of illustration.

Figure 4:
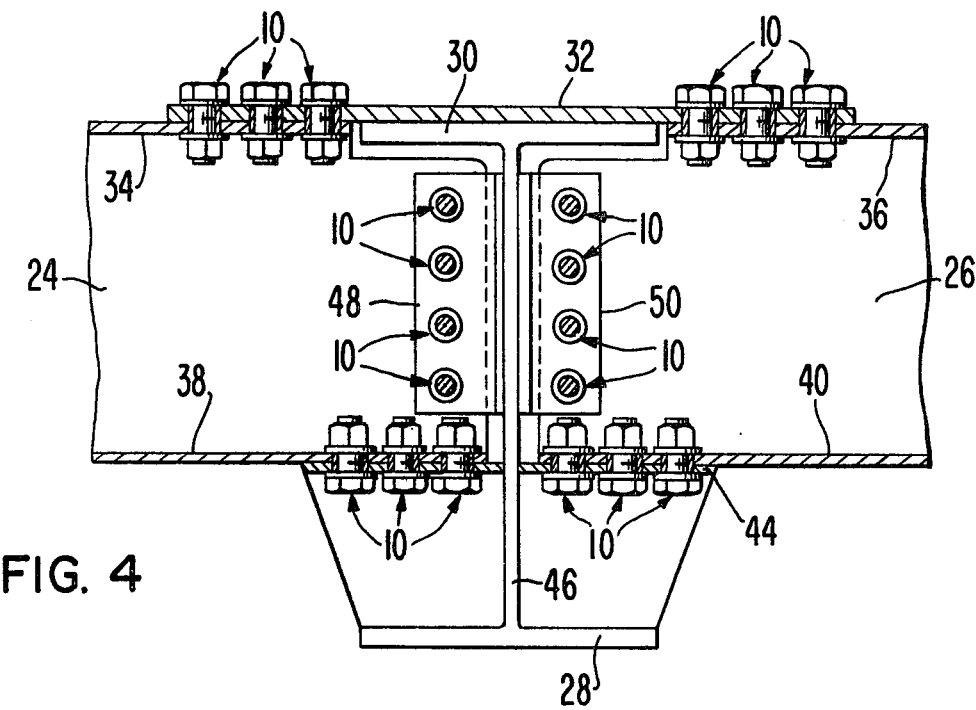
FIG. 4 is a vertical section through part of a structural steel building having a plurality of resilient connectors of the type shown in FIG. 3 for interconnecting a column and a beam.

In all cases, the connectors shown in FIG. 4 have resilient sleeves 22 associated therewith. The sleeves are substantially complemental to the holes of the structural members into which the connectors extend. Thus, part of the energy associated with the movement of one structural frame member relative to the adjacent frame member is immediately absorbed by the various sleeves 22. Building 11 will have thousands of connectors 10 coupled to the many structural frame members of the building. Thus, the major part of the energy caused by an earthquake or other geological disturbances will be dissipated as heat since the connectors allow some movement of the various frame members relative to each other without deforming the bolts of the connectors or the frame members themselves. If the geological disturbance is of mild intensity, the building can withstand it with no permanent damage. Most such disturbances are of only minor intensities. Thus, connectors 10 provide a safety feature for the building which is not available when conventional connectors are used.

Figure 5:
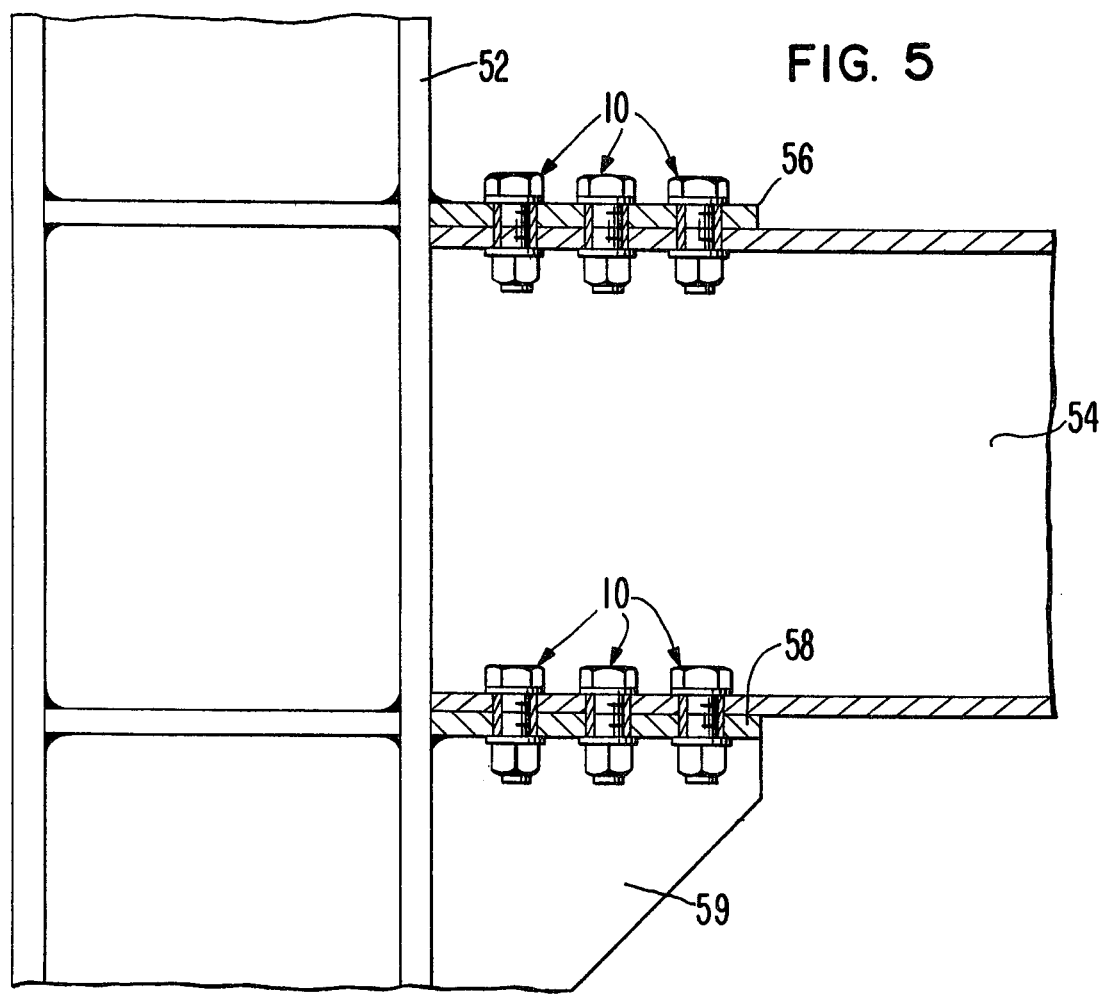
FIG. 5 is a view similar to FIG. 4 but showing another use of the connectors for interconnecting a column and a beam.

FIG. 5 illustrates one way a column 52 and a beam 54 are interconnected by connectors 10. Column 52 has upper and lower horizontal flanges or plates 56 and 58 welded to one vertical flange 57 thereof. Plate 58 has a web 59 also welded to column 52. Connectors 10 interconnect the flanges of beam 54 to plates 56 and 58 and serve the same purpose as those of FIG. 4, namely, to absorb energy and to allow dissipation of energy as heat of friction due to the relative movement between column 52 and beam 54.

Sleeve 22 could be manufactured as a long tube or hose and cut into segments to match the thicknesses of the two or more structural parts being interconnected by the corresponding connector. For ease of assembly, the sleeve could be cut longitudinally to form a split sleeve so as to more easily slip over the bolt. This is shown in FIG. 7.

Figure 6:
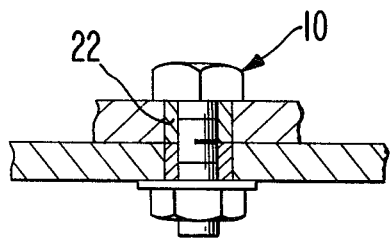
FIG. 6 is a vertical cross section through a second embodiment of the resilient connector.
Figure 7:
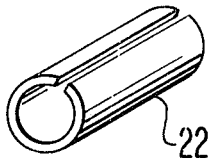
FIG. 7 is a perspective view of another embodiment of the sleeve of the connector.
Figure 8:
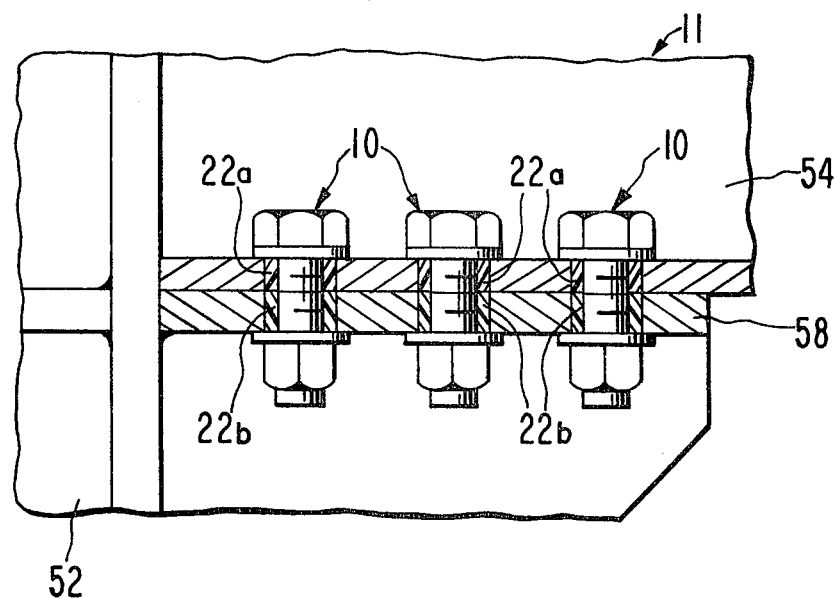
FIG. 8 is a view similar to FIG. 5 but showing still a further embodiment of the sleeve means.

Instead of making the sleeve means of each connector 10 a single sleeve, it can be formed of two sleeves 22a and 22b as shown in FIGS. 6-8. Each of these two sleeves surrounds the corresponding bolt 12 and has an axial length substantially equal to the axial length of the hole of the corresponding flange in which it is disposed. Thus, the end faces of each of these two sleeves are substantially flush with the end faces of the corresponding flange.

FIG. 8, being a view similar to FIG. 5, shows three connectors 10, each having two sleeves 22a and 22b, the connectors interconnecting the flange of beam 54 and the flange 58 of column 52. Each of the two sleeves of each connector substantially fills the space between the corresponding bolt and the corresponding flange and the sleeves are in abutment with each other.

Figure 9:
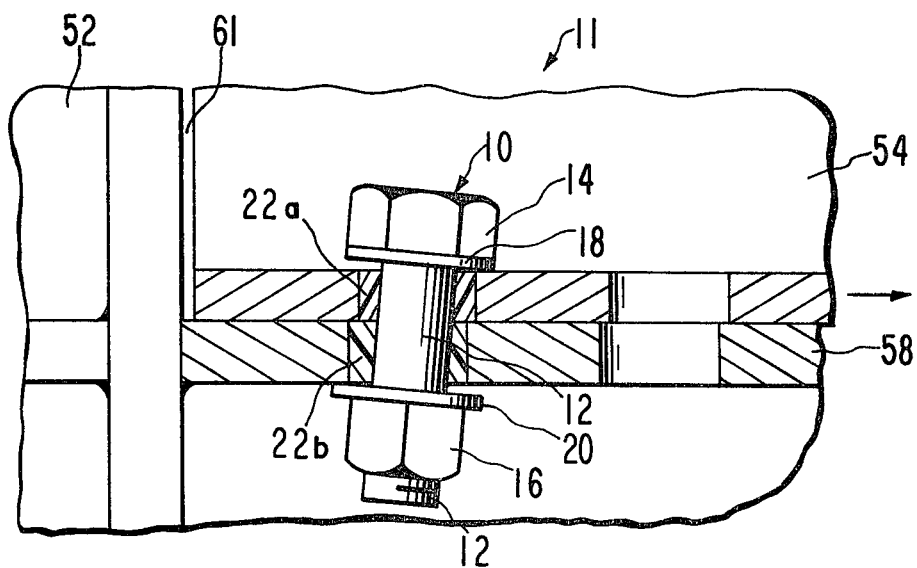
FIG. 9 is a view similar to FIG. 8 but showing the effects on the connectors when one structural frame member has moved a short distance relative to the adjacent structural frame member.

FIG. 9 is a view similar to FIG. 8 but showing the displacement on an exaggerated scale of a connector 10 having two sleeves 22a and 22b. This figure shows that beam 54 has moved a slight distance to the right, such as during an earthquake or other disturbance, causing the bolt of the connector to become slightly canted and causing the sleeves to be compressed at certain locations, illustrating that some of the energy due to the movement will be absorbed by the two sleeves, while other portions of the energy will be dissipated as heat due to friction caused by the sliding of the flange of beam 54 over flange 58. The displacement of beam 54 relative to column 52 is indicated by the gap 61 (FIG. 9) therebetween.

It is also clear from FIG. 9 that, for small displacements of beam 54 relative to column 52, there will be substantially no deformation of the corresponding connectors 10, thereby allowing the connectors to be returned to normal positions as shown in FIG. 8 if the disturbance is such that displacement in the opposite direction occurs. Nonetheless, even if beam 54 remains permanently at the position shown in FIG. 9 relative to column 52, these structural members will remain positively interconnected without requiring repair or other structural work to maintain the structural integrity of the building.

Figure 10:
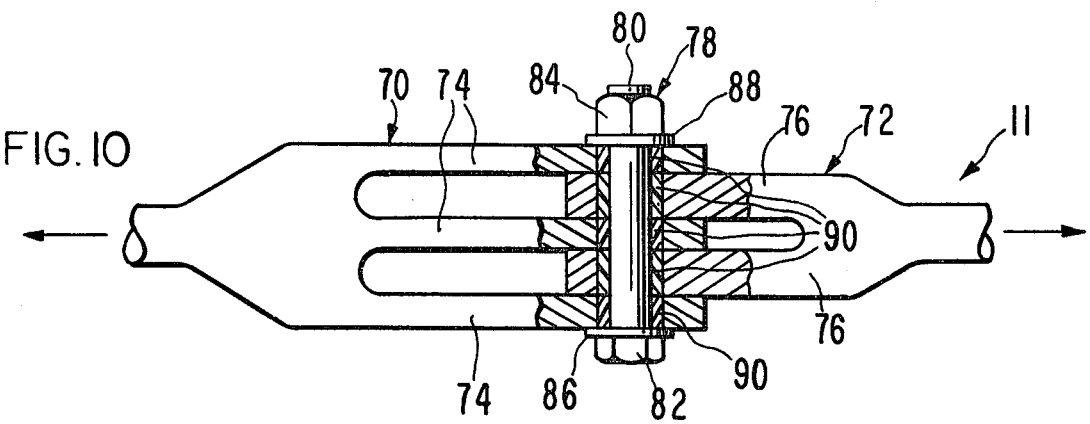
FIG. 10 is a side elevational view of a pair of interconnected structural frame members of the type having a number of different projecting portions.

While the above description has been made with respect to two adjacent structural members or flanges, it is clear that the teachings of the invention can be used for interconnecting structural members having a number of different projections, such as structural members 70 and 72 having projections 74 and 76 which are generally parallel and which are interleaved as shown in FIG. 10. In such a case, projections 74 and 76 can be interconnected by one or more connectors 78 formed of a bolt 80 having a head 82, a nut 84, washers 86 and 88, and resilient sleeve means surrounding the bolt, such sleeve means being shown in FIG. 10 as individual sleeves having axial lengths substantially equal to the axial length of a hole in a corresponding projection. Connector 78 thus allows structural members 70 to move laterally relative to structural frame members 72 through a short distance without deformation of the connector or of the projections of the frame members themselves.

Connector 10, when introduced into building construction, will open a totally new avenue of building design and construction for earthquake loading. The idea would be to design the building for its vertical and lateral loads and then also to compute the amount of energy that the building must absorb to withstand the "design earthquake"; and from this information, to calculate the number of shock absorbing sleeves to use and of what material. The energy-absorbing capacity of each size sleeve and of each type of sleeve material would be rated in design manuals for use in building design. Those ratings would be based on approved laboratory tests for each sleeve size and material, i.e., rubber, neoprene, Teflon or "superooze", with "superooze" intended to represent some future developed material with tremendous capacities to squash under load and fully recover after energy absorption.

I claim:

1. A building comprising: a frame having a plurality of frame members of structural metal, each frame member having a surface in face-to-face sliding engagement with the surface of an adjacent frame member, there being a number of holes through each frame member and terminating at said surface thereof, the holes of each frame member being aligned with corresponding holes of the adjacent frame member; and a resilient connector for each pair of aligned holes, respectively, of a corresponding pair of frame members, each connector including a bolt having a head at one end and a nut threaded on the opposite end, and resilient sleeve means surrounding the bolt, each connector extending through a respective pair of aligned holes with the head of the corresponding bolt engaging one frame member and the corresponding nut engaging the other frame member and forcing the corresponding surfaces into said face-to-face sliding engagement with each other.

2. A building as set forth in claim 1, wherein said sleeve means includes a single sleeve having a length substantially equal to the axial distance through the corresponding aligned holes.

3. A building as set forth in claim 1, wherein said sleeve means includes a pair of abutting sleeves.

4. A building as set forth in claim 3, wherein each sleeve of a connector has an axial length substantially equal to the axial length of the hole of a corresponding frame member.

5. A building as set forth in claim 1, wherein said sleeve means of each connector substantially abuts the corresponding head and nut.

6. A building as set forth in claim 1, wherein said sleeve means substantially fills the annular space between the corresponding bolt and the corresponding frame members.

7. A building as set forth in claim 1, wherein said building is formed from a plurality of columns and beams, certain of said connectors being operable to connect particular beams to corresponding columns.

8. A building as set forth in claim 1, wherein each frame member has a flange, the holes of each frame member being through the flange thereof, the flanges of one frame member being in sliding engagement with the flange of an adjacent frame member.

9. A building as set forth in claim 1, wherein each of at least a pair of frame members has a plurality of spaced, generally parallel, aligned projections, the holes of each frame member extending through the projections thereof, the projections of one of said pair of frame members being interleaved with the projections of the other of said pair of frame members.

10. A building as set forth in claim 1, wherein said surfaces are flat, each connector having a washer engaging the corresponding head and a washer engaging the corresponding nut, the sleeve means extending between the washers.

* * * * *